Oct. 5, 1926.

N. A. CHRISTENSEN 1,601,907

CONTROL VALVE MECHANISM FOR TRIPLE VALVE AIR BRAKE SYSTEMS

Original Filed Nov. 28, 1924    2 Sheets-Sheet 2

INVENTOR.

Niels A. Christensen

BY

Juarles & French

ATTORNEYS

Patented Oct. 5, 1926.

1,601,907

UNITED STATES PATENT OFFICE.

NIELS A. CHRISTENSEN, OF MILWAUKEE, WISCONSIN.

CONTROL-VALVE MECHANISM FOR TRIPLE-VALVE AIR-BRAKE SYSTEMS.

Original application filed November 28, 1924, Serial No. 752,680. Divided and this application filed August 1, 1925. Serial No. 47,506.

The invention relates to brake systems for trains, and more particularly automotive vehicle trains which include the main automotive vehicle and the trailers pulled thereby.

One object of the invention is to provide a control valve mechanism for triple valve mechanism for brake systems for automotive vehicles which will operate efficiently on automotive vehicle trains under the operating conditions encountered.

Another object of the invention is to provide a control valve mechanism so associated with the triple valve mechanism of the vehicles or cars making up the train that a graduated release of the air in the brake system may be effected so that the automatic air brake system thus provided will have the advantages of the sensitive control present in the straight air brake construction.

This application is a division of my copending application Serial No. 752,680, filed November 28, 1924, for triple valve air brake apparatus for trains, and more particularly the control valve mechanism of said application.

The invention further consists in the several features hereinafter set forth and more particularly defined by claims at the conclusion hereof.

In the drawings: Fig. 1 is a diagrammatic view of the air brake system embodying the invention;

Fig. 2 is a vertical sectional view through one of the couplings;

Fig. 3 is a vertical sectional view through the control valve mechanism;

Fig. 4 is a vertical sectional view through a triple valve mechanism.

Figure 1:
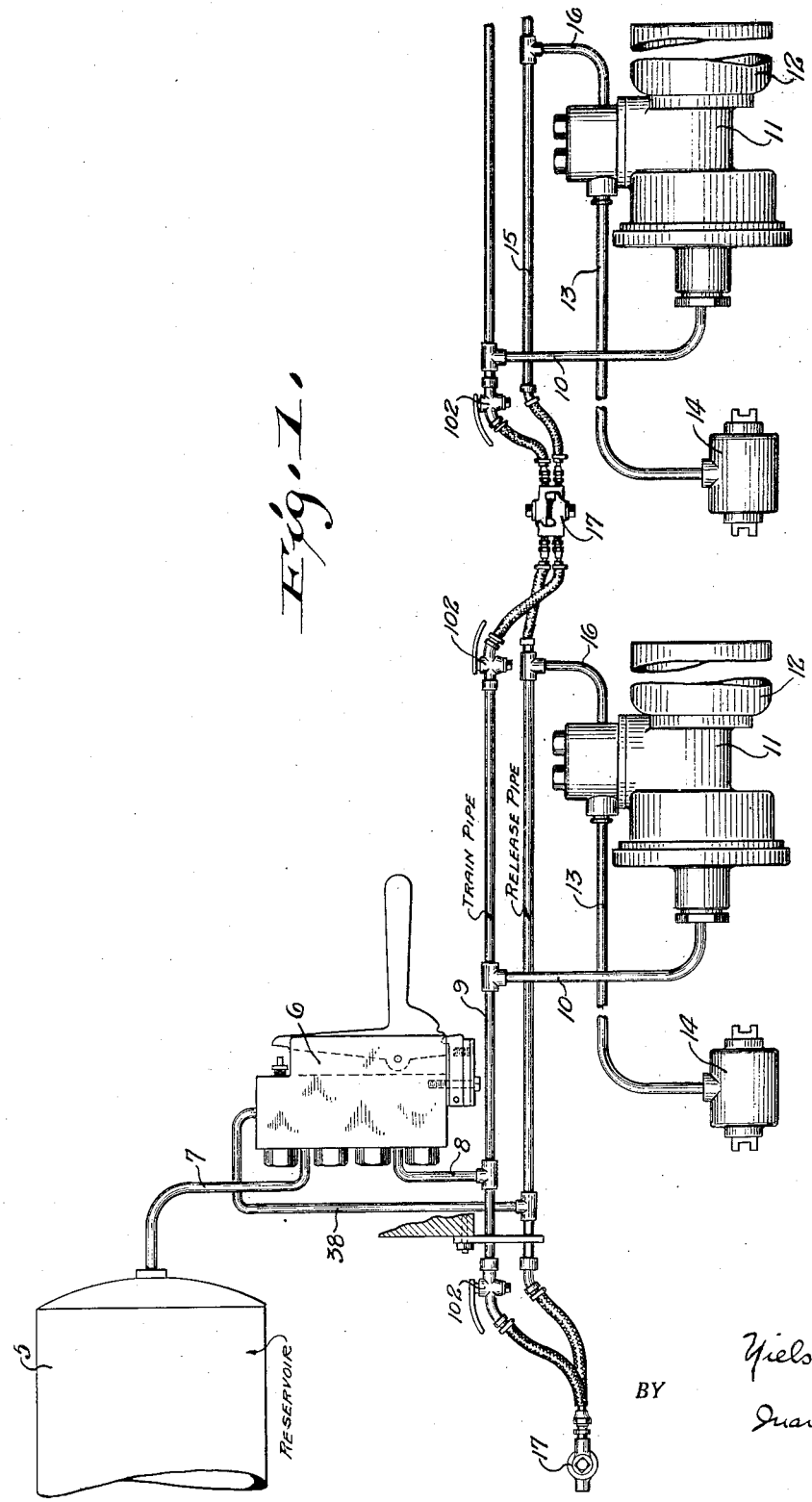

In the drawings the numeral 5 designates the main reservoir, 6 the control valve mechanism, 7 a pipe connecting said reservoir with said mechanism, 8 a pipe connecting said mechanism with the train pipe 9, 10 pipes respectively connecting the train pipe 9 with each of the triple valve mechanism 11, 12 the auxiliary reservoirs, 13 a pipe connecting each triple valve with the brake cylinder or cylinders 14, 15 a release pipe connected with the control valve mechanism, and 16 a pipe leading from the exhaust port of each triple valve to the release pipe 15.

As is well understood, the main reservoir and the control valve mechanism are mounted on the main or hauling vehicle, the reservoir receiving its air from a compressor driven by the engine of the vehicle. The train pipe 9 and release pipe 15 are each made in sections, one for each vehicle of the train, which sections are connected by suitable flexible pipe sections and a coupling 17. The automotive hauling vehicle and the trailers are each provided with brake cylinders associated with one or both sets of wheels and with the triple valve mechanism for controlling its own brakes, one brake cylinder and triple valve mechanism being shown for the vehicle itself and another for one of its trailers.

The main control valve mechanism, shown in Fig. 3, comprises a housing 18, suitably mounted on the hauling vehicle, and four valves 19, 20, 21 and 22, each urged to its seat by a spring 23. Each valve has a tubular portion 24 slidably mounted in the bore of a boxnut 25 with its spring mounted in said tubular portion between the end thereof and the end of the bore in said nut. The valves 19, 20, 21 and 22, respectively, work in chambers 26, 27, 28 and 29, which respectively communicate, when the valves are open, with bores 30, 31, 32 and 33. The bore 30 is connected with atmosphere by a duct 34. The bore 31 is connected by conduit 35 with the pipe 7. The bore 32 is connected by a conduit 36 with the pipe 8. The bore 33 is connected with atmosphere by a duct 37. The chamber 26 is connected by a pipe 38 to the release pipe 15. A duct 39 connects the chambers 27 and 28 and a duct 40 connects the conduit 36 with the chamber 29.

The valves 19, 20, 21 and 22 are opened by the respective inward movement of pins 41, 42, 43 and 44. Each of these pins is similarly constructed with a conical head portion 45, bearing against its valve, for a gradual increase of port opening as the valve which controls it is opened. The stems 46 of these pins project through bores in the casing 18 and beyond the same for engagement by an operating lever 47. The stems of the pins 42 and 43 are preferably packed by suitable stuffing boxes 48. The valves 19 and 22 are release or exhaust valves, while the valves 20 and 21 are inlet valves.

The operating lever 47, pivoted intermediate its ends at 49, has an arm 50 to engage the pins 41, 42 and 43, and another arm 51 to engage the pin 44, and a handle 52. This lever may be held in various positions, as hereinafter described, by means of a pivoted detent or pawl 53 urged by a spring 54 into engagement with a notched quadrant or sector 55 on the lever 49.

The triple valve mechanism may be of any suitable construction and is not to be limited to the construction herein shown, as any suitable triple valve mechanism may be used with the control valve mechanism herein described. By way of illustration, each triple valve mechanism comprises a housing 56 including a cylinder 57 in which the valve-operating piston 58 works. This piston is provided with the usual packing ring 59, and its rod 60 works through the rear end of the cylinder 57 and is slotted at 61 intermediate its ends and provided with a cross-pin 62. The depending slotted end 63 of a T-headed lever 64 engages this pin 62 within the slotted portion of said rod and is, therefore, moved by the piston 58.

The lever 64 is mounted on a fulcrum pin 65 carried by a depending part of a valve housing 66 containing valves 67 and 68, urged to their seats by springs 69 mounted between the tubular parts of said valves and boxnuts 70. The valves are respectively operated by pins 71 and 72, which are similar in constructional details to the pins previously described so that a gradual passage of air may be effected through the ports surrounding these pins. The stems of said pins are preferably packed by suitable stuffing boxes 73. The valves 67 and 68 are held tightly to their seats by their springs unless opened by the lever 64 whose arms, upon the swinging of said lever by the piston 58 and its rod, are adapted to alternately open and close said valves by movement of the operating pins 71 and 72. The housing 66 is securely mounted in an air-tight manner upon the housing 56. The valves 67 and 68, respectively, work in chambers 74 and 75 which communicate, respectievly, when the valves are open, with bores 76 and 77. The bore 76 communicates with a passage 78 leading to the brake pipe 13 and to the chamber 75, and the bore 77 with a passage 79 leading to the release piping 16 and 15. The chamber 74 communicates by a passage 80 with a chamber 81.

Train pipe pressure is introduced into the forward end of the cylinder 57 through the connection of pipe 10 to the apertured end 82 of the cover 83 for the cylinder 57. The rear end of the cylinder communicates with the auxiliary reservoir 12 through port 84, chamber 81 and port 85. There is sufficient leakage between the cylinder 57 and the piston 58 to allow compressed air from the train pipe to pass around said piston through the passages just mentioned to the auxiliary reservoir 12 to fill it with air to the same pressure as the train pipe.

The excess pressure valve 20 is provided with a comparatively strong spring so that when not opened by the lever 47 it will remain tightly seated; the handle 52 in this position, as shown in Fig. 3, being held by a notch 86 engaged by the pawl 53. In this position the train pipe pressure valve 21 will be held open by said lever 47, with the tendency of its spring to close it when said lever is released from its operating pin 43. The valve 20 is used to retain an excess of pressure of the air in the main reservoir 5 over and above that in the train pipe 9 for the purpose of creating a difference in pressure between the main reservoir and train pipe, and to insure a positive release of the triple valves when the lever 47 is moved in the direction of the arrow to hold the valve 20 open. This need only be for a sufficient length of time to cause a complete release of all triple valves through the introduction of air at main reservoir pressure to the train pipe 9 and hence to the forward ends of the cylinders 57, causing the pistons 58 to travel toward the right, thereby swinging the lever 64 so as to move pins 72 to open the exhaust valves 68 for the whole train. The result of this action is to introduce air into the release pipe 15. The release of air from the pipe 15 is under the control of the operator through the valve 19, whose operating pin 41 is associated with the arm 50 of the lever 47 so that, as shown, a continued movement of the lever 47 from the last-described position, will cause said lever to open said valve 19, and as the extent of opening is under the control of the operator, either a gradual or quick release of the pressure in the release pipe 15 to atmosphere, through pipe 38, chamber 26, bore 30 and duct 34, may be obtained, with the result that the release of pressure from the brake cylinders 14 takes place in like manner. The time at which the valve 20 opens relative to the other valves may be varied. It may be opened simultaneously with the opening of the excess pressure valve 21, or it can be opened, as shown, somewhat later so that the triple valves are moved to release position, in which position the brake cylinder pressure is retained in the release pipe which will, in and of itself, cause a slight drop of brake-cylinder-pressure, or what might be called a partial release, without any air escaping to the atmosphere.

In either case, however, the control of the air from the pipe 15 through the operation of the valve 20 permits of the desired release of the air from the brake cylinders. Furthermore, if it is desired to increase the brake cylinder pressure without releasing any pressure therefrom, another slight reduction in train pipe pressure can be made, which will close the release valves in the triple valves and increase the pressure in the brake cylinder without opening the release pipe to atmosphere. The operation of release can again be repeated without letting any of the release-pipe-pressure out until it is desired to make a full release. As soon as the control valve handle assumes the running position the excess pressure valve 20 will function and admit a reduced reservoir pressure through the then open train pipe valve 21, the release valve 19 having resumed its seat by action of its own spring as soon as the operating handle ceases contact with the operating pin 41 on said valve.

The application of the brakes is accomplished by the reduction in pressure in the train pipe 9 through the opening of the valve 22 by the swinging of the handle 52 in the opposite direction to that of the arrow, this reduction causing the pressure in the reservoir 12 and the rod end of cylinder 57 to move the piston 58 toward the cover 83, thereby swinging the lever 64 into engagement with the pin 71 and moving the same to open the valve 74 so that air from the reservoir 12 flows through port 85, chamber 81, port 80, chamber 74, bore 76, conduit 78 to the brake pipes 13 and hence to the brake cylinders to apply the brakes. Thus, compressed air flows from the auxiliary reservoir to the brake cylinder, thereby reducing the auxiliary reservoir pressure until the pressure between the reservoir and the brake cylinder is again balanced or is slightly in excess on the train pipe side, when the triple valve piston 58 will again move to the right but will, of its own accord, stop before it has traveled far enough to cause the lever 64 to operate pin 72 to open valve 68, the pressure on which, in the meantime, has been increased over the pressure of its spring by the pressure of the air in the brake line which has also entered the chamber 75 through the passage 78. If it is desired to apply the brake still harder, another slight train pipe reduction is made by again opening the valve 22 and the valve 67 will again open and more air will be admitted to the brake line to increase the pressure therein.

However, the brakes may be held in applied position without either adding or decreasing the pressure therein by moving the lever 47 in a direction to make a brake application until the free end of the arm 50 is free of the pin 43 for the valve 21 and the arm 51 has not yet engaged the pin 44 for the valve 22 to a "lap" position, which may be determined by a notch 87 on the quadrant 55 engaged by the pawl 53.

The train pipe 9 and the release pipe 15 may each have their own individual couplings, but in Fig. 2 I have shown a coupling for both of these pipes. This consists of two complementary interlockable coupling members 88. Each of these members has communicating release passages 89 and 90, with a shut-off valve 91 between said passages and a train pipe passage 92 communicating with an annular space 93. Each valve 91 is urged to its seat 94 by a spring 95 mounted in the tubular stem 96 of the valve and in the tubular part of a box-nut 97. Each valve has an extension pin 98 engageable with a pin on the other valve to hold both valves open when the coupling members are joined. The annular space 93 is formed by complementary channel-shaped packing rings 99 held to the couplings by channel-shaped metal rings 100 and bolts 101. When the coupling members are disengaged the valves 91 close off the ends of the exhaust or release pipe. The usual shut-off cock valves 102 are provided at the ends of each section of the train pipe 9.

From the foregoing it will be noted that the main control valve mechanism 6 acts to control the triple valve mechanism on each vehicle of the automotive train, and, due to the release valve, under the control of the operator, the brake system herein described functions with the same effectiveness as is present in straight air brake construction.

A detailed showing of the brake mechanism has not been made as any suitable brake mechanism, associated with the vehicle wheels, may be used.

In my prior application, Serial No. 752,680, previously mentioned, while the triple valve mechanism is shown as exhausting direct to atmosphere instead of through a valve-controlled train release pipe, the control valve mechanism including the valves 20, 21 and 22, and their operating means, and their association in the brake system, are the same and hence the control valve mechanism of said application, Serial No. 752,680, has been divided therefrom and the claimable subject-matter thereof has been included in this application.

I desire it to be understood that this invention is not to be limited to any particular form of arrangement of parts except in so far as such limitations are specified in the claims.

What I claim as my invention is:

1. In a fluid pressure brake system for trains, the combination with the main reservoir, of an auxiliary reservoir, a train pipe connecting said reservoirs, a brake line, a piston operable on difference of pressure between the train pipe and the auxiliary reservoir, triple valve mechanism actuated by said piston, a release pipe associated with the release valves of the triple valve mechanism, a control valve mechanism associated with the train pipe line and the release pipe line comprising spring-closed pipe valves, one valve to maintain a difference in pressure between the main reservoir and train pipe, a second valve to maintain the piston in running position, a third valve to effect a reduction of train pipe pressure for making a brake application, said above-named valves being associated with the train pipe, and a fourth valve associated with the release pipe to control the release of air from the release pipe and hence from all the triple valves, and an operator-controlled means for actuating said valves.

2. In a fluid pressure brake system for trains, the combination with the main reservoir, of an auxiliary reservoir, a train pipe connecting said reservoirs, a brake line, a piston operable on difference of pressure between the train pipe and the auxiliary reservoir, triple valve mechanism actuated by said piston, a release pipe associated with the release valves of the triple valve mechanism, a control valve mechanism associated with the train pipe line and the release pipe line comprising spring-closed pipe valves, one valve to maintain a difference in pressure between the main reservoir and train pipe, a second valve to maintain the piston in running position, a third valve to effect a reduction of train pipe pressure for making a brake application, said above-named valves being associated with the train pipe, and a fourth valve associated with the release pipe to control the release of air from the release pipe and hence from all the triple valves, and an operator-controlled means for actuating said fourth valve after the operation of said first and second valves.

3. In a fluid pressure brake system for trains, the combination with the triple valve mechanism and control valve mechanism for effecting the actuation of the triple valve mechanism, of a release pipe associated with the exhaust from each of the triple valve mechanisms, and an operator-controlled release valve to control the release of air from said release pipe and hence the release of the brakes associated with such triple valve mechanisms.

4. In a fluid pressure brake system for trains, the combination with the main reservoir, of an auxiliary reservoir, a train pipe connecting said reservoirs, a brake line, a piston operable on difference of pressure between the train pipe and the auxiliary reservoir, triple valve mechanism actuated by said piston, a release pipe connected with the exhaust side of each of the triple valve mechanisms, a control valve mechanism including an excess pressure valve, a train pipe valve, a train pipe reduction valve in the train pipe line and an exhaust valve in the release pipe line, a pivoted operator-controlled lever having an arm associated with the two first-named valves and the exhaust valve and operable to open the two first-named valves before operating said exhaust valve and having another arm operating the train pipe reduction valve, said arms being oppositely disposed from the pivot point of said lever.

5. In a fluid pressure brake system for trains, the combination with the main reservoir, of an auxiliary reservoir, a train pipe connecting said reservoirs, a brake line, a piston operable on difference of pressure between the train pipe and the auxiliary reservoir, valve mechanism actuated by said piston, and control valve mechanism in the train pipe line including three spring-closed poppet valves, one valve to maintain a difference in pressure between the main reservoir and train pipe and, upon being positively opened, insuring a positive release, another valve to effect a reduction of train pipe pressure for making a brake application, and the third valve to maintain the piston in running position, and an operator-controlled means for actuating said valves.

6. In a fluid pressure brake system for trains, the combination with the main reservoir, of an auxiliary reservoir, a train pipe connecting said reservoirs, a brake line, a piston operable on difference of pressure between the train pipe and the auxiliary reservoir, valve mechanism actuated by said piston, and control valve mechanism in the train pipe including three spring-closed poppet valves, one valve to maintain a difference in pressure between the main reservoir and train pipe, and upon being positively opened, insuring a positive release, another valve to effect a reduction of train pipe pressure for making a brake application, and the third valve to maintain the piston in running position, and an operator-controlled lever for actuating said valves to accomplish the above operations, said lever being so related to said valves as to provide a "lap" position for maintaining the braking pressure and permitting a reapplication without full release of braking pressure.

7. In a fluid pressure brake system for trains, the combination with the main reservoir, of an auxiliary reservoir, a train pipe connecting said reservoirs, a brake line, a piston operable on difference of pressure between the train pipe and the auxiliary reservoir, valve mechanism actuated by said piston, and control valve mechanism in the train pipe line including three spring-closed poppet valves, one valve to maintain a difference in pressure between the main reservoir and train pipe and, upon being positively opened, insuring a positive release, another valve to effect a reduction of train pipe pressure for making a brake application, and the third valve to maintain the piston in running position, an operator-controlled lever for actuating said valves to accomplish the above operations, said lever being so related to said valves as to provide a "lap" position for maintaining the braking pressure and permitting a reapplication without full release of braking pressure, and means for holding said lever in "running" position.

8. In a fluid pressure brake system for trains, the combination with the main reservoir, of an auxiliary reservoir, a train pipe connecting said reservoirs, a brake line, a piston operable on difference of pressure between the train pipe and the auxiliary reservoir, valve mechanism actuated by said piston, and control valve mechanism in the train pipe line including three spring-closed poppet valves, one valve to maintain a difference in pressure between the main reservoir and train pipe and, upon being positively opened, insuring a positive release, another valve to effect a reduction train pipe pressure for making a brake application, and the third valve to maintain the piston in running position, an operator-controlled lever for actuating said valves to accomplish the above operations, said lever being so related to said valves as to provide a "lap" position for maintaining the braking pressure and permitting a reapplication without full release of braking pressure, and means for holding said lever in different operating positions.

In testimony whereof, I affix my signature.

NIELS A. CHRISTENSEN.